(No Model.)
I. A. BANG & C. A. SANGUINETTI.
EXTRACTION OF OILS AND FATS FROM OLEAGINOUS AND FATTY BODIES.
No. 297,743. Patented Apr. 29, 1884.
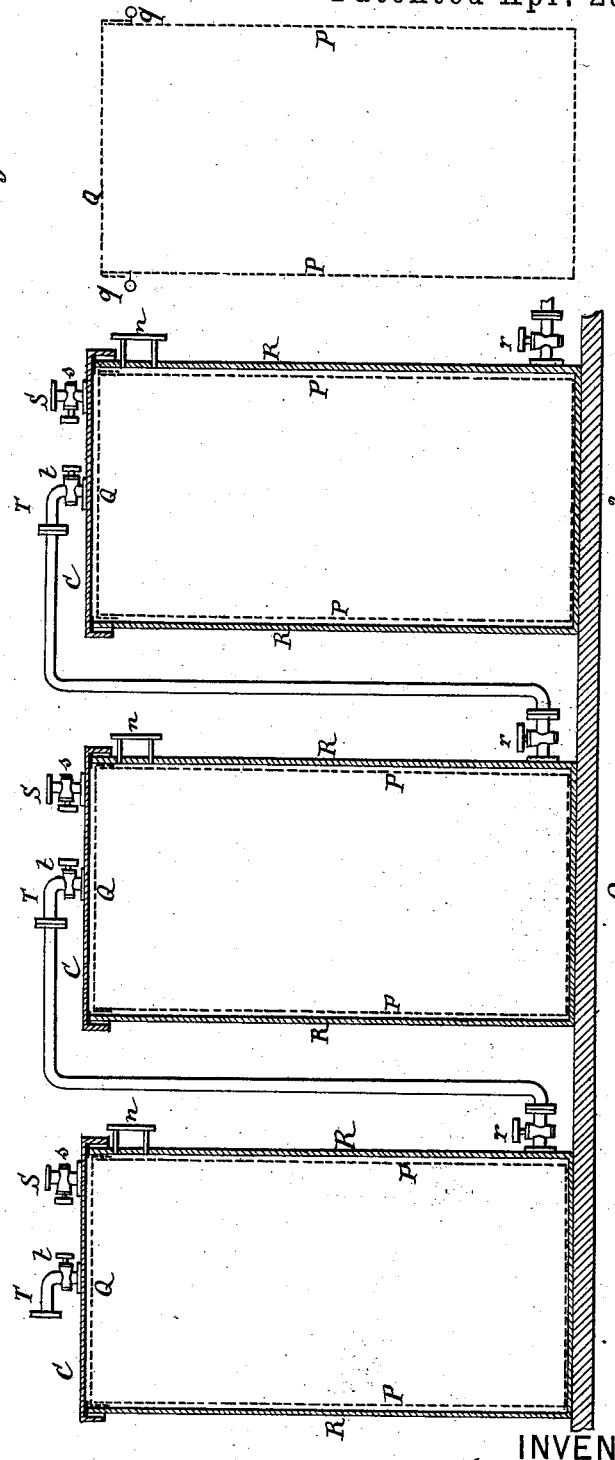
WITNESSES:
INVENTORS:
Ivar Axel Bang
Chas. Albert Sanguinetti
By his Attorneys,

UNITED STATES PATENT OFFICE.

IVAR AXEL BANG, OF PARIS, AND CHARLES ALBERT SANGUINETTI, OF MARSEILLES, FRANCE.

EXTRACTION OF OILS AND FATS FROM OLEAGINOUS AND FATTY BODIES.

SPECIFICATION forming part of Letters Patent No. 297,743, dated April 29, 1884.

Application filed May 31, 1883. (No model.) Patented in France April 19, 1883, No. 142,662.

*To all whom it may concern:*

Be it known that we, IVAR AXEL BANG, a subject of the King of Denmark, and a resident of Paris, France, and CHARLES ALBERT SANGUINETTI, a subject of the King of Italy, residing at Marseilles, (Bouches-du-Rhône,) France, have jointly invented certain Improvements in Methods Employed for the Extraction of Oils and Fats from Oleaginous and Fatty Bodies, of which the following is a specification.

Our invention is particularly well adapted to the extraction of oil from oleaginous vegetable matters—as seeds, husks, &c.—and we have herein described it in its application to this purpose. The extraction of oil from such substances has heretofore been effected, almost exclusively, by pressure, either with or without heat. The substance is usually submitted to three successive pressings, the resultant being three grades of oils having different commercial values. By this method, however, there still remains from seven to eight per cent. of oil in the cake, which cannot be removed by any known mechanical means. This cake is sometimes used as food for cattle and sometimes as a fertilizer; but in either case there is a great loss. Many attempts have been made to extract the oil from such substances by solvents—such as carbon disulphide, benzine, and essence of petroleum. The results obtained, however, have been so discouraging as to lead to the entire abandonment of these modes, except in a few special cases. The reason is that all of these solvents have naturally a disagreeable smell, and it has been almost impossible to entirely remove their odor from both the oil and the residuum or cake. In extracting oils from vegetable substances several conditions are necessary. The oil must be pure and without other odor, color, or taste than that which naturally pertains to it. These conditions are practically impossible with the substances named, as they possess an odor which infects not only the oil but the cake after the oil has been wholly removed therefrom; but there are also other difficulties to be encountered. When treating substances of little value, and which will not be injured by water—such as olive-husks, &c.—and which are coarsely broken or pulverized, steam may be used for expelling the solvents employed; but when treating ground oleaginous seeds and other materials of a similar nature this process becomes impossible. The condensed steam forms a pasty mass of the substance, which envelops the solvent and effectually prevents it from being volatilized. Our process seeks to obviate all of these difficulties. It is based on the principle of diffusion, and the oil and fatty matters are extracted by submitting the oleaginous substances, in a state of fine subdivision, to the action of a diffusing-liquid, which acts on the substances in a manner similar to the action of diffusing agents employed in the extraction of sugar. As a diffusing agent we employ, by preference, a volatile inodorous liquid, which leaves no trace whatever of its presence, either in the oil or fat extracted or the cake that remains. This is a pure hydrocarbon obtained from petroleum and rendered inodorous by a special treatment, which will be hereinafter described. Besides this hydrocarbon, we may also employ chemically-pure benzine and all liquids of a similar character.

In the accompanying drawings we have shown a simple apparatus which we prefer to employ in carrying out our process.

Figure 1 shows three of a series of reservoirs employed in our process, and Fig. 2 is a detached view of one of the wire panniers or baskets for containing the substance to be treated. These will be referred to more particularly hereinafter.

The first step is the purification and deodorizing of the diffusing agent. We take, by preference, the lighter products of petroleum, generally known under the name of "essence légère." By fractional distillation of this liquid we obtain a very volatile product which boils at from 40° to 70° centigrade. We might employ a heavier product, but we prefer the more volatile product, as it requires a less expenditure of fuel to dissipate and vaporize it. The liquid thus obtained is thoroughly agitated with sulphuric acid at 66° until the latter is no longer colored. We then add from two to three per cent. of fuming or anhydrous sulphuric acid and agitate the mixture again strongly. The mixture is then decanted, and we have a volatile product which will leave no odor whatever, either in the oil or in the residue or cake. The next step is to extract the oil from the substance treated by the agency of the diffusing agent above described.

Referring now to the drawings, we place in the wire basket P the substance from which the oil is to be extracted—as, for example, ground or crushed seeds. This basket has a removable cover, Q, provided with suitable fastenings, q q. The filled basket is now slipped into a reservoir, R, made from metal not attacked by oil. This reservoir has an outlet near its bottom controlled by a cock, r, and is closed hermetically at the top by a cover, C. In this cover are two apertures, S and T, controlled, respectively, by cocks s and t. A liquid-gage, n, is provided near the upper part of the reservoir, to enable the operator to ascertain the level of the liquid therein. The cover C being closed hermetically by means of a rubber packing, the diffusing agent is allowed to flow in at the aperture T, the cock s being opened to allow air to escape. When the gage n indicates that the reservoir is full, the cock t is closed and the substance allowed to remain in a state of saturation for about fifteen minutes. This period will vary considerably, however, according to the nature of the substance treated. The liquid diffuses itself through the mass, traverses the membranes of the cells, and takes the place of a portion of the oil, which escapes and mixes with the surrounding solvent.

We have referred to the reservoir R, marked No. 1. Three of these are shown, numbered 1, 2, and 3, but we usually employ a series or battery of ten. When the saturation in No. 1 is completed, the mixture of oil and diffusing-liquid is drawn off into No. 2, which has been previously charged. The transfer is effected by exhaustion, the aperture S in No. 2 is put in communication with a vacuum-producing apparatus, and the aperture T is connected with r in No. 1 by a pipe. The cocks are opened and the liquid flows from No. 1 to No. 2. The liquid is now allowed to remain in No. 2 also about fifteen minutes. A new charge of the diffusing-liquid is now passed into No. 1 and allowed to remain about five minutes. During this time a charge of the ground substance may be placed in No. 3, and the liquid from No. 2 is then drawn off into No. 3, while the liquid in No. 1 is drawn off into No. 2. This process is continued throughout the other reservoirs, 4 5 6, &c., in the same manner as above described. After a time the charge in No. 1 will be found entirely free from oil, which may be ascertained by dropping a little of the liquid on a piece of paper. If it evaporates without oiling the paper, it is proof that no oil remains.

To recover the diffusing-liquid with which the residuum in the reservoirs is saturated, we employ the following process: The aperture controlled by cock r is connected with a refrigerant, and this in turn with the reservoir in which the liquid is kept. When the cock is opened, all the free liquid flows out to the reservoir. When no more will flow, the cock r is closed and the aperture T connected with a worm or coil immersed in a hot bath of oil, glycerine, or calcium chloride. The other end of the coil is connected with an alembic, in which a small quantity of the essence or liquid is volatilized. The vapor thus produced passes through the superheating-coil and acquires a temperature of 120° to 130°, by preference, from whence it passes into the mass in the reservoir and removes all traces of the diffusing-liquid therefrom. This it accomplishes by first heating the mass throughout, when condensation ceases and the superheated vapor imbibes the volatilized vapor from the essence in the reservoir. The cock r is now opened and the vapors flow off through the condenser to the reservoir. When the thermometer indicates that the temperature of the contents of the reservoir has risen above the point of ebullition of the liquid employed, we may assume that all of the liquid has been volatilized. The current of vapor is then stopped, and the exhausted residuum may be removed from the reservoir. It will be found to be perfectly dry. If it be desired to remove every trace of the solvent from the dry residuum, a jet of dry superheated steam may be turned for an instant into the reservoir as a final step.

Our process applies to the extraction of oil from maize, bones, suet, fish, &c. When treating solid fatty matters, it will be necessary to slightly warm the diffusing agent, either by a hot-water jacket on the reservoir or by heating the agent previous to its use. The diffusing-liquid, charged with oil and fatty matter in solution, is distilled in order to recover the oil, &c., therefrom.

We do not herein claim our method of deodorizing the light hydrocarbon before its use, as this forms no part of our present application. We have described it herein to illustrate our method of extraction, but other deodorizing methods may be employed as well.

We are aware that it is not new to deodorize light products of petroleum, and that it is not new to comminute substances before the extraction of oil therefrom; and we are also fully aware, as we have stated, that these volatile hydrocarbons have been before employed with more or less good results in the extraction of oils from fatty bodies. Therefore we do not claim this, broadly.

Having thus described our invention, we claim—

The method herein described for treating oleaginous and fatty bodies in order to extract oil therefrom, which consists in first reducing the substance to a finely-divided state, then saturating it with a volatile deodorized product of petroleum, then drawing off the free liquid, and then passing the superheated vapor of a portion of the said volatile liquid through the mass in order to remove therefrom the remaining portions of the volatile solvent, substantially as set forth.

In witness whereof we have hereunto signed our names in the presence of two subscribing witnesses.

IVAR AXEL BANG.
CHARLES ALBERT SANGUINETTI.

Witnesses:
GUSTAV T. LANG,
LOUIS FABRES.